(12) United States Patent
Golin et al.

(10) Patent No.: US 12,006,854 B2
(45) Date of Patent: **\*Jun. 11, 2024**

(54) VEHICLE EXHAUST SYSTEM

(71) Applicant: Tenneco Automotive Operating Company Inc., Northville, MI (US)

(72) Inventors: Michael A Golin, Ann Arbor, MI (US); Gabriel Ostromecki, Ann Arbor, MI (US)

(73) Assignee: Tenneco Automotive Operating Company Inc., Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,252

(22) Filed: Feb. 28, 2023

(65) Prior Publication Data
US 2023/0203973 A1    Jun. 29, 2023

Related U.S. Application Data

(63) Continuation of application No. 16/443,123, filed on Jun. 17, 2019, now Pat. No. 11,608,762.

(51) Int. Cl.
*F01N 1/00* (2006.01)
*F01N 13/04* (2010.01)

(52) U.S. Cl.
CPC .............. *F01N 1/003* (2013.01); *F01N 13/04* (2013.01)

(58) Field of Classification Search
CPC ........ F01N 1/003; F01N 1/026; F01N 13/007; F01N 1/006; F01N 13/04; F01N 2410/10; F01N 2410/14
See application file for complete search history.

(56) References Cited

U.S. PATENT DOCUMENTS

| | | |
|---|---|---|
| 1,989,675 A | 2/1935 | Bobo |
| 4,164,989 A | 8/1979 | Lux et al. |
| 4,537,277 A | 8/1985 | Bryce |
| 4,842,096 A | 6/1989 | Fujitsubo |
| 6,109,387 A | 8/2000 | Boretti |
| 7,174,991 B1 | 2/2007 | Gunnarsson et al. |
| 7,407,036 B2 | 8/2008 | Kobayashi et al. |
| 7,455,498 B2 | 11/2008 | Zysman |
| 7,775,323 B2 | 8/2010 | Schweinberger |

(Continued)

FOREIGN PATENT DOCUMENTS

| | | |
|---|---|---|
| CN | 108331638 | 7/2018 |
| DE | 102005053356 | 3/2016 |

(Continued)

*Primary Examiner* — Jeremy A Luks
(74) *Attorney, Agent, or Firm* — McGarry Bair PC

(57) ABSTRACT

A vehicle exhaust system includes a tubular component defining a primary exhaust gas flow path with a primary exhaust gas outlet. At least one opening is defined by the tubular component and extends through an inner surface and an outer surface of the tubular component. A plate is disposed on the outer surface of tubular component and covers the at least one opening. A secondary exhaust gas flow path is defined by the at least one opening in the tubular component, through a plurality of elongated flow channels, and through the outlet opening defined by the plate. The exhaust gases flowing through the secondary exhaust gas flow path are exhausted to atmosphere in a different location than the primary outlet.

24 Claims, 13 Drawing Sheets

(56) References Cited

U.S. PATENT DOCUMENTS

| | | |
|---|---|---|
| 7,918,310 B1 | 4/2011 | Helgeson et al. |
| 8,162,103 B2 | 4/2012 | Barrieu et al. |
| 8,439,156 B1 | 5/2013 | Abram |
| 8,528,692 B2 | 9/2013 | Teshima |
| 8,539,761 B2 | 9/2013 | Lebas et al. |
| 8,881,863 B2 | 11/2014 | Abram et al. |
| 8,931,284 B2 | 1/2015 | Hussain et al. |
| 9,523,304 B2 | 12/2016 | Furuya et al. |
| 9,970,340 B2 | 5/2018 | Abram et al. |
| 10,047,650 B2 | 8/2018 | Abram |
| 10,233,814 B2 | 3/2019 | Wasif et al. |
| 11,225,897 B2 | 1/2022 | Baumgartner et al. |
| 11,608,762 B2 * | 3/2023 | Golin .................. F01N 13/04 |
| 2008/0017444 A1 | 1/2008 | Dowdy |
| 2008/0230307 A1 | 9/2008 | Matsumoto et al. |
| 2009/0178879 A1 | 7/2009 | Park et al. |

FOREIGN PATENT DOCUMENTS

| | | |
|---|---|---|
| FR | 2914958 A1 | 10/2008 |
| FR | 3027995 A1 | 5/2016 |
| JP | 2015129479 A | 7/2015 |

* cited by examiner

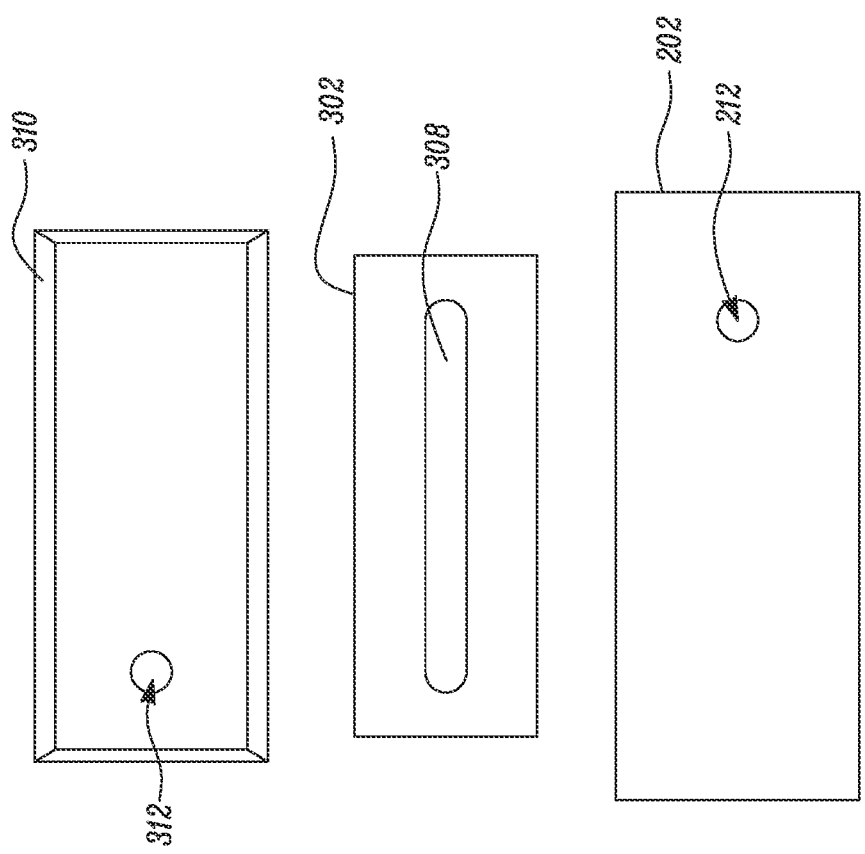

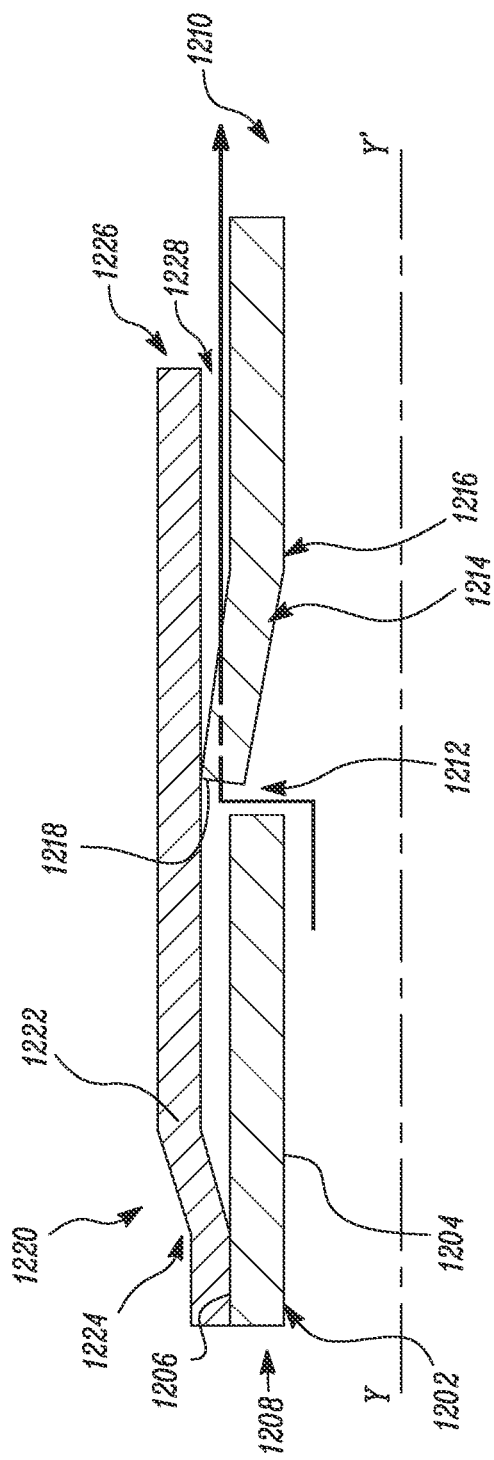
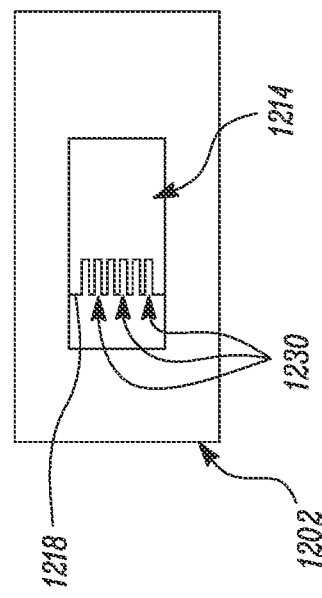

VEHICLE EXHAUST SYSTEM

CROSS-REFERENCE TO RELATED APPLICATION(S)

This application claims priority to and is a continuation of U.S. patent application Ser. No. 16/443,123, filed Jun. 17, 2019, now U.S. Pat. No. 11,608,762, issued Mar. 21, 2023, the entirety of which is incorporated herein by reference in its entirety.

TECHNICAL FIELD

The present disclosure relates to a vehicle exhaust system. More specifically, the present disclosure relates to damping of sound generated by the vehicle exhaust system.

BACKGROUND

A vehicle exhaust system directs exhaust gas generated by an internal combustion engine to external environment. The exhaust system may include various components, such as pipes, converters, catalysts, filters, and the like. During operation of the exhaust system, as a result of resonating frequencies, the components may generate undesirable noise. Different methods have been employed in various applications to address this issue.

For example, the components, such as mufflers, resonators, valves, and the like, have been incorporated into the exhaust system to attenuate certain resonance frequencies generated by the exhaust system. However, such additional components are expensive and increase weight of the exhaust system. Also, adding new components into the exhaust system introduces new sources of undesirable noise generation.

A well-known sound attenuating method is a Standing Wave Management (SWM) technology. The SWM includes an opening provided on an exhaust pipe. The opening provides a secondary exhaust leak path for sound to exit the exhaust pipe and minimizes leakage of the exhaust gas through the opening. The SWM utilizes a series of holes to allow sound waves to exit the exhaust pipe while limiting leakage of the exhaust gas. In some instances, the holes may be covered with a microperforated material to dampen the noise. In order to achieve a desired noise attenuation, the holes have to be relatively large in size.

However, the microperforated material is very thin and is not as structurally sound as a solid pipe wall of the exhaust pipe. As such, creating holes in the microperforated material may adversely affect durability of the microperforated material. Additionally, if relatively larger holes are cut into the exhaust pipe and covered with the microperforated material, durability of the exhaust pipe may also be adversely affected. Another concern is with grazing flow that may occur across a surface of the microperforated material. The acoustic properties of the microperforated material may change when the exhaust gas flows across the surface of the microperforated material. This may often reduce an ability of an acoustic wave to propagate through the micro perforations, which may limit the damping effect.

Additionally, the SWM has a well-known failure mode when debris, such as salt or mud, may plug the opening. The SWM may include multilayer parts where the debris may accumulate behind the multilayer parts and result in premature failure of the SWM. Also, for efficient functioning of the SWM, a desired diameter size of each of the series of holes may have to be less than 1 millimeter (mm). However, conventional manufacturing methods make it difficult to produce a 1 mm diameter hole in a material thicker than 1 mm. More specifically, durability of the component may be compromised if component thickness may be limited to 1 mm.

Hence, there is a need for an improved vehicle exhaust system for such applications.

SUMMARY

In an aspect of the present disclosure, a vehicle exhaust system is provided. The vehicle exhaust system comprises a tubular component having an inner surface and an outer surface and extends along a central axis from an inlet end to an outlet end and defines a primary exhaust gas flow path for exhaust gases in a first direction from the inlet end toward the outlet end. The outlet end defines a primary outlet for the exhaust gases from the tubular component to atmosphere. At least one opening is defined by the tubular component, wherein the at least one opening extends through the inner surface and the outer surface. A plate is disposed on the outer surface of tubular component and covering the at least one opening. The plate defines a plurality of elongated flow channels extending away from the at least one opening and adapted to receive exhaust gases from the at least one opening and further defining an outlet opening adapted to receive exhaust gases from the flow channel. A secondary exhaust gas flow path is defined by the at least one opening in the tubular component, through the plurality of elongated flow channels, and through the outlet opening defined by the plate. Exhaust gases flowing through the secondary exhaust gas flow path are exhausted to atmosphere in a different location than the primary outlet.

In another aspect of the present disclosure, a vehicle exhaust system includes a tubular component having an inner surface and an outer surface and extends along a central axis from an inlet end to an outlet end and defining a primary exhaust gas flow path for exhaust gases in a first direction from the inlet end toward the outlet end. The outlet end defines a primary outlet for the exhaust gases from the tubular component to atmosphere. At least one opening is defined by the tubular component, wherein the at least one opening extends through the inner surface and the outer surface. A first plate is disposed on the tubular component. The first plate comprises a plurality of flow channels adapted to receive exhaust gases from the at least one opening. A second plate separate from the first plate covers the plurality of flow channels and comprises at least one outlet opening positioned remote from the at least one opening in the tubular component and adapted to receive exhaust gases from the plurality of flow channels. A secondary exhaust gas flow path is defined by the at least one opening in the tubular component, through the plurality of flow channels, and through the outlet opening defined by the second plate. Exhaust gases flowing through the secondary exhaust gas flow path are exhausted to atmosphere in a different location than the primary outlet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

FIG. 5 is an exploded view of the patch of FIG. 3, according to an aspect of the present disclosure;

FIG. 12A is a schematic sectional side view of a vehicle exhaust system, in accordance with the present invention;

FIG. 12B is a schematic top view of the vehicle exhaust system of FIG. 12A, in accordance with the present invention.

DETAILED DESCRIPTION

Figure 1:
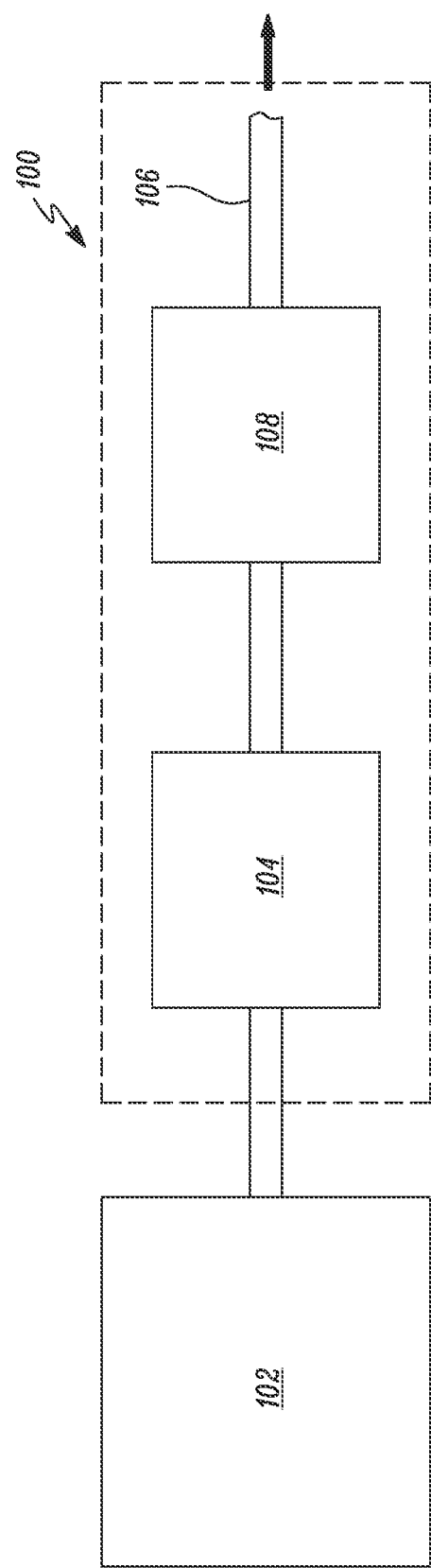
FIG. 1 is a schematic representation of a vehicle exhaust system, according to an aspect of the present disclosure.

The following description of the preferred embodiment(s) is merely exemplary in nature and is in no way intended to limit the invention, its application, or uses. Referring now to the drawings in which like reference numerals designate like or corresponding parts throughout the several views, there is shown in FIG. 1. Referring to FIG. 1, a schematic representation of a vehicle exhaust system 100 is illustrated. The vehicle exhaust system 100 will be hereinafter interchangeably referred to as the "system 100". The system 100 is fluidly coupled to an engine 102. The engine 102 may be any internal combustion engine powered by a fuel, such as diesel, gasoline, natural gas, and/or a combination thereof. Accordingly, the system 100 receives exhaust gas generated by the engine 102.

The system 100 includes a number of downstream exhaust components 104 fluidly coupled to the engine 102. The exhaust components 104 may include a number of systems/components (not shown), such as a Diesel Oxidation Catalyst (DOC), a Diesel Exhaust Fluid (DEF) unit, a Selective Catalytic Reduction (SCR) unit, a particulate filter, an exhaust pipe, an active valve, a passive valve and the like. The exhaust components 104 may be mounted in various different configurations and combinations based on application requirements and/or available packaging space. The exhaust components 104 are adapted to receive the exhaust gas from the engine 102 and direct the exhaust gas to the external atmosphere via a tailpipe 106. The exhaust components 104 are adapted to reduce emissions and control noise.

The system 100 also includes an acoustic damping member, such as a muffler 108. The muffler 108 is provided in fluid communication with the exhaust components 104 and the tailpipe 106. In the illustrated embodiment, the muffler 108 is disposed downstream of the exhaust components 104 and upstream of the tailpipe 106. In other embodiments, the muffler 108 may be disposed in any sequence with respect to each of the exhaust components 104 and/or the tailpipe 106, based on application requirements. The muffler 108 is adapted to dampen resonance frequencies generated during operation of the engine 102 and the system 100.

Figure 2:
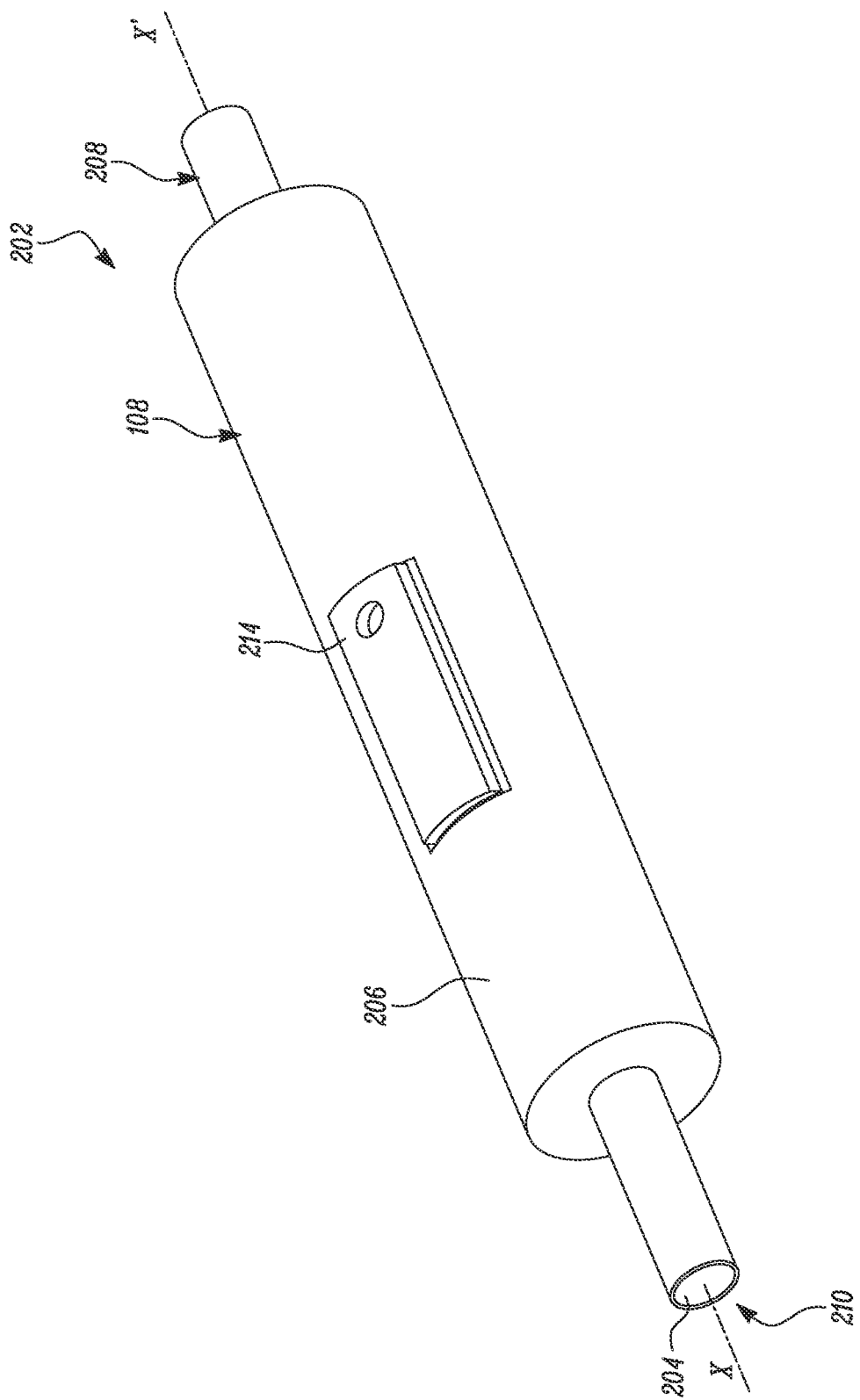
FIG. 2 is a perspective view of a tubular component of the vehicle exhaust system of FIG. 1, according to an aspect of the present disclosure.

Referring to FIG. 2, a perspective view of an exemplary tubular component 202 associated with the system 100 is illustrated. In the illustrated embodiment, the tubular component 202 is the muffler 108. In other embodiments, the tubular component 202 may be any one or more of the exhaust components 104 and/or any portion of the system 100, such as the exhaust pipe, the tailpipe 106, and the like. The tubular component 202 has a substantially hollow and cylindrical configuration defining a central axis X-X'. Accordingly, the tubular component 202 includes an inner surface 204 and an outer surface 206. The tubular component 202 also includes an inlet end 208 and an outlet end 210. The outlet end 210 is disposed opposite and spaced apart with respect to the inlet end 208 along the central axis X-X'. The tubular component 202 defines a primary exhaust gas flow path along the inner surface 204 between the inlet end 208 and the outlet end 210 along the central axis X-X'.

The tubular component 202 also includes an opening 212 (shown in FIG. 3 to FIG. 6). In the illustrated embodiment, the tubular component 202 includes a single opening 212. In other embodiments, the tubular component 202 may include multiple openings, based on application requirements. The opening 212 extends through each of the inner surface 204 and the outer surface 206. In the illustrated embodiment, the opening 212 has a substantially rectangular configuration. In other embodiments, the opening 212 may have any other configuration, such as circular, triangular, elliptical, and the like. The opening 212 provides a secondary exhaust gas flow path in association with the primary exhaust gas flow path.

Figure 3:
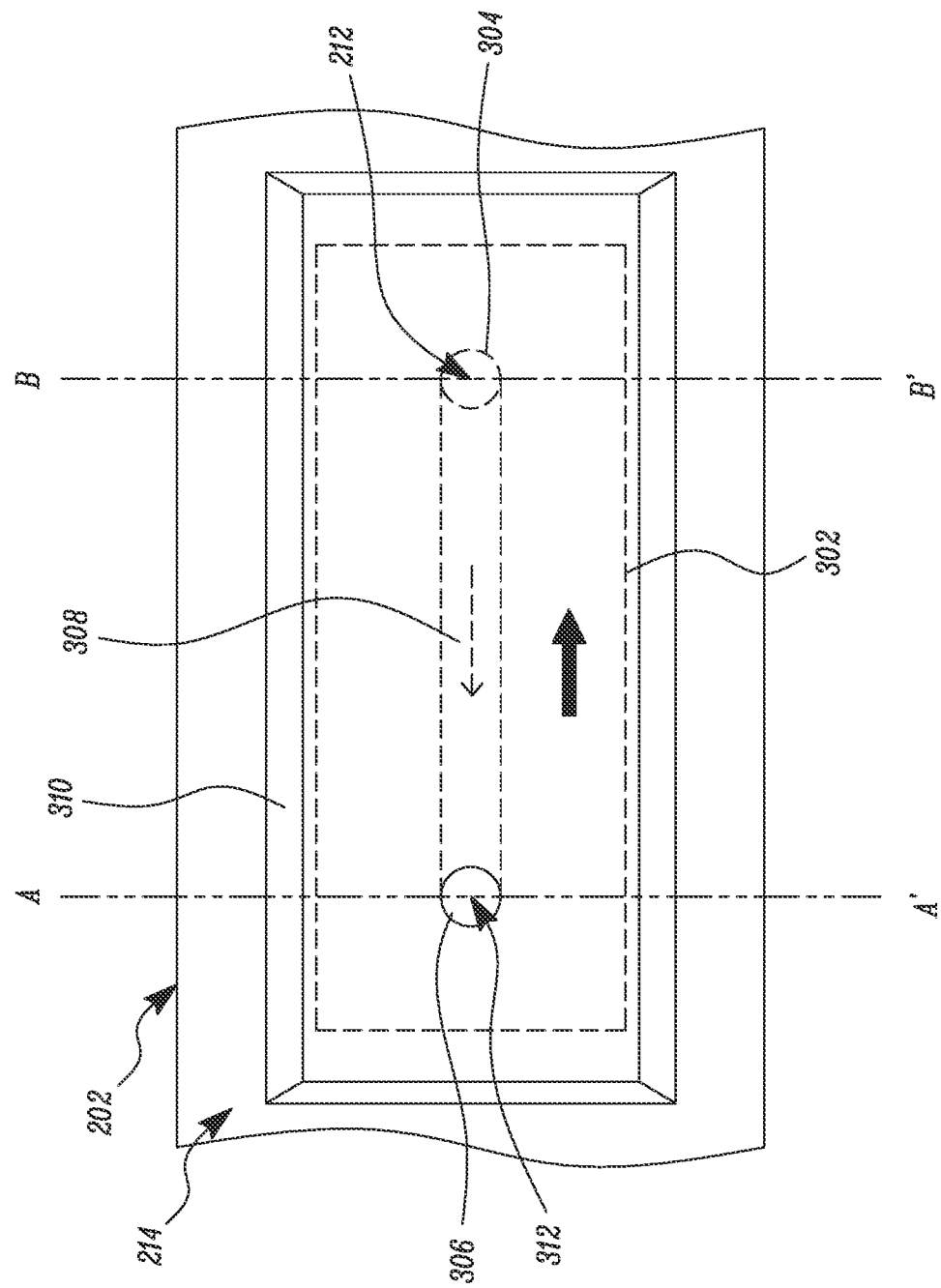
FIG. 3 is a front view of a patch for the tubular component of FIG. 2, according to an aspect of the present disclosure.

The system 100 also includes a patch 214 coupled to the tubular component 202. More specifically, the patch 214 is disposed adjacent to the opening 212 in order to cover the opening 212. Referring to FIG. 3, a front view of an embodiment of the patch 214 is illustrated. The patch 214 may have any suitable structural configuration, based on the configuration of the opening 212.

Figure 4B:
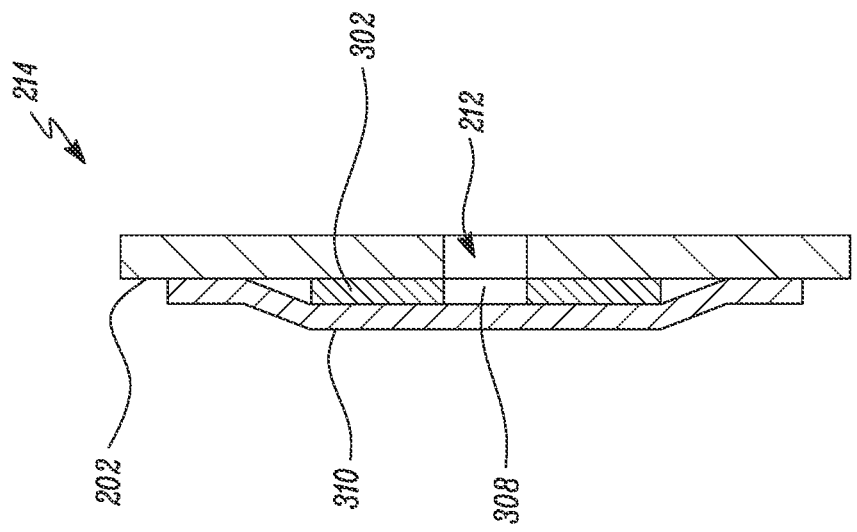
FIG. 4B is a cross sectional view of the patch of FIG. 3 along a section B-B', according to an aspect of the present disclosure.
Figure 4A:
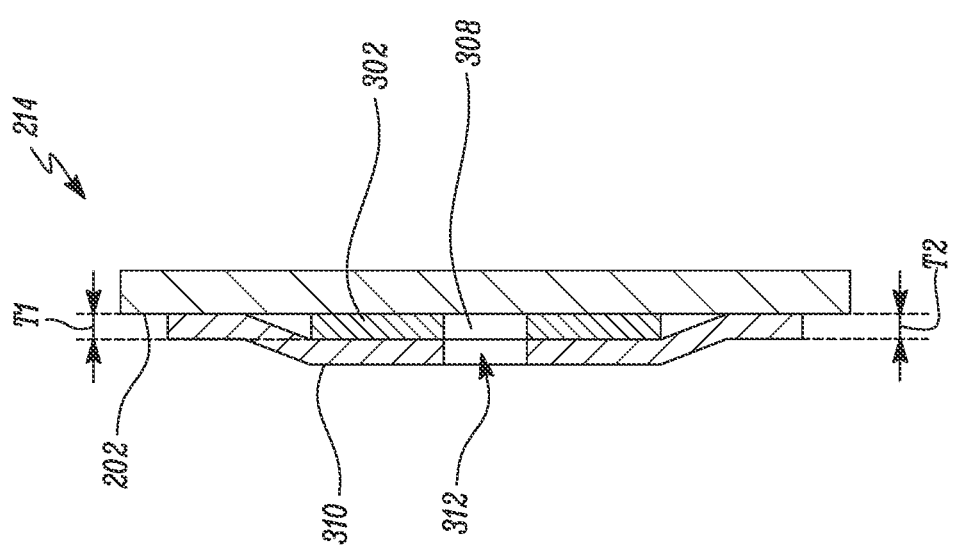
FIG. 4A is a cross sectional view of the patch of FIG. 3 along a section A-A', according to an aspect of the present disclosure.

FIG. 3 further shows a first sectional plane A-A' and a second sectional plane B-B'. Sectional view of the patch 214 through the plane A-A' is shown in FIG. 4A and sectional view of the patch 214 through plane B-B' is shown in FIG. 4B. With combined reference to FIGS. 3, 4A and 4B, the patch 214 includes a first plate 302. The first plate 302 is disposed on the tubular component 202. The first plate 302 defines at least one slot 308. In the illustrated embodiment, the at least one slot 308 includes a single slot 308. However, the first plate 302 may include any appropriate number of slots 308 as per application requirements. In an embodiment, a number of openings 212 is equal to a number of slots 308. The slot 308 has a first end 304 and a second end 306. The first end 304 is disposed towards the opening 212. The second end 306 is disposed opposite to the first end 304. The slot 308 extends between the first end 304 and the second end 306. The slot 308 is in fluid communication with the opening 212 towards the first end 304.

The patch 214 further includes a second plate 310. The second plate 310 is disposed on the first plate 302. The second plate 310 at least partially encloses the first plate 302. The second plate 310 at least partially defines at least one outlet opening 312. In the illustrated embodiment, the second plate 310 defines a single outlet opening 312. However, the second plate 310 may include any appropriate number of outlet openings 312 as per application requirements. In an embodiment, a number of slots 308 is equal to a number of outlet openings 312. The outlet opening 312 is in fluid communication with the slot 308 towards the second end 306.

A secondary exhaust flow path is defined for the exhaust gases flowing through the tubular component 202. The secondary exhaust flow path is defined through the opening 212, the slot 308, and the outlet opening 312. The exhaust gases exit the tubular component 202 through the opening 212, then flow through the slot 308 from the first end 304 towards the second end 306, and then flow out through the outlet opening 312. The secondary exhaust gas flow path resembles a serpentine shape and may be referred to as a serpentine shaped flow path.

The first plate 302 has a first thickness $T_1$ and the second plate 310 has a second thickness $T_2$. In an embodiment, the second thickness $T_2$ is greater than the first thickness $T_1$. However, the present disclosure is not limited by the relative thicknesses of the first plate 302 and the second plate 310 in any manner. Other combinations of relative thicknesses of the first plate 302 and the second plate 310 may be envisioned and are well within the scope of the present disclosure. The first plate 302 and the second plate 310 may have similar or different thickness as per application requirements.

FIG. 5 shows an exploded view of the patch 214 showing the first plate 302, the second plate 310 and the tubular component 202. The tubular component 202 defines the opening 212. The first plate 302 defines the slot 308, and the second plate 310 defines the outlet opening 312.

Figure 6B:
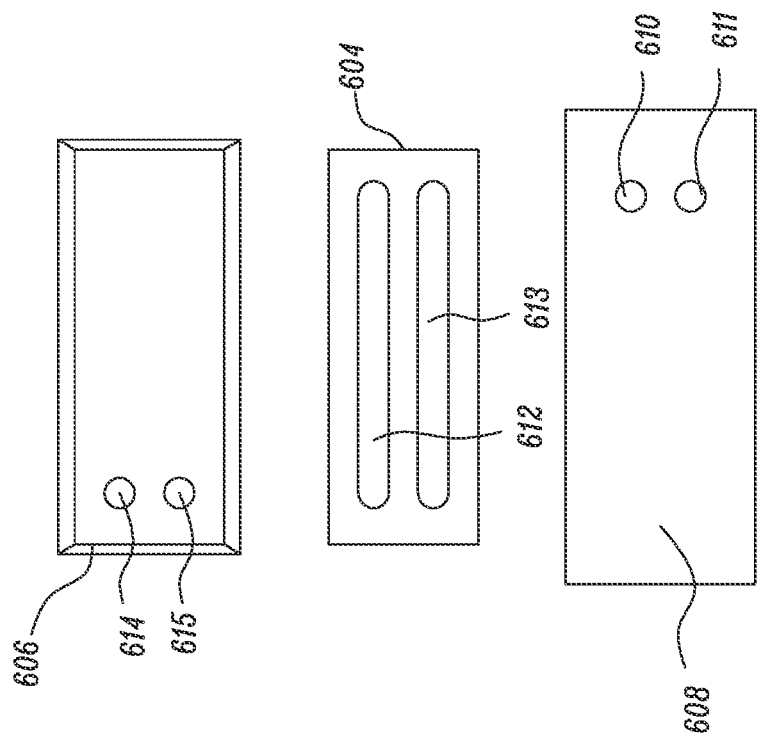
FIG. 6B is an exploded view of the patch of FIG. 6A, according to another aspect of the present disclosure.
Figure 6A:
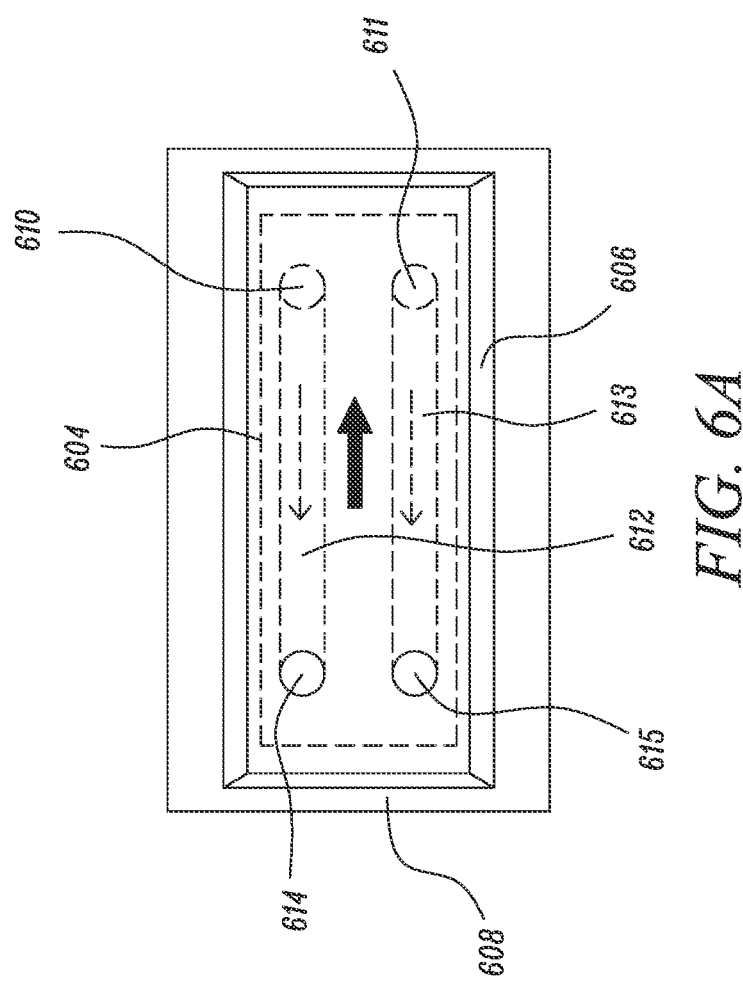
FIG. 6A is a front view of another patch for the tubular component of FIG. 2, according to another aspect of the present disclosure.

FIG. 6A shows a front view of a patch 602 according to another embodiment of the present disclosure. The patch 602 includes a first plate 604 and a second plate 606. FIG. 6B shows an exploded view of the patch 602 disposed over a tubular component 608. With combined reference to FIGS. 6A and 6B, the tubular component 608 includes at least one opening. In the illustrated embodiment, the at least one opening includes a first opening 610 and a second opening 611. Further, the first plate 604 includes at least one slot. In the illustrated embodiment, the at least one slot includes a first slot 612 and a second slot 613. The first slot 612 is fluidly coupled with the first opening 610, and the second slot 613 is fluidly coupled with the second opening 611.

The second plate 606 includes at least one outlet opening. In the illustrated embodiment, the at least one outlet opening includes a first outlet opening 614 and a second outlet opening 615. The first outlet opening 614 is fluidly coupled with the first slot 612 and the second outlet opening 615 is coupled with the second slot 613. The first and second openings 610, 611, the first and second slots 612, 613 and the first and second outlet openings 614, 615 together define a secondary exhaust gas flow path. The exhaust gases flow through the first and second openings 610, 611 in the tubular component 608, the first and second slots 612, 613 and the first and second outlet openings 614, 615.

Figure 7:
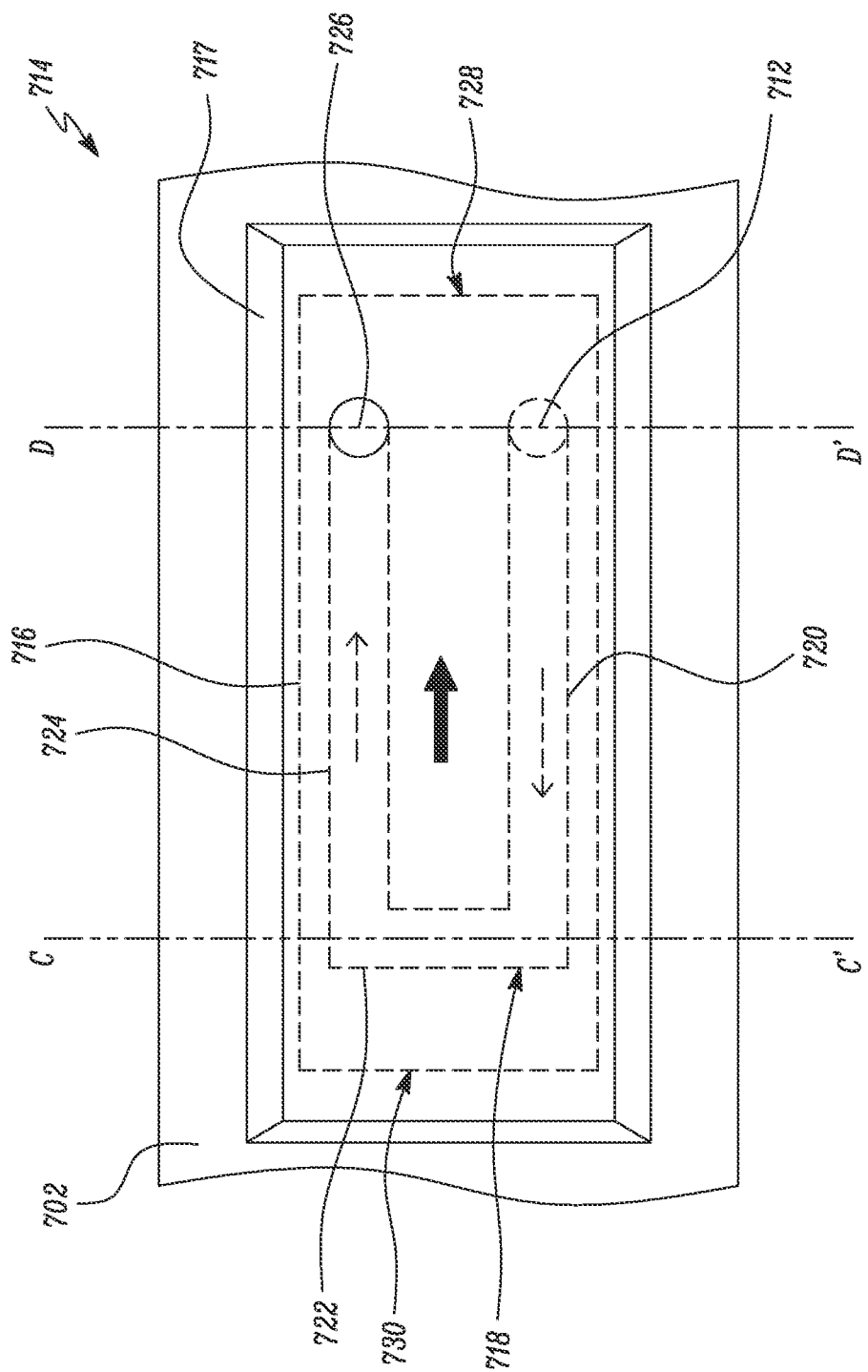
FIG. 7 is a front view of another patch for the tubular component of FIG. 2, according to another aspect of the present disclosure.
Figure 8:
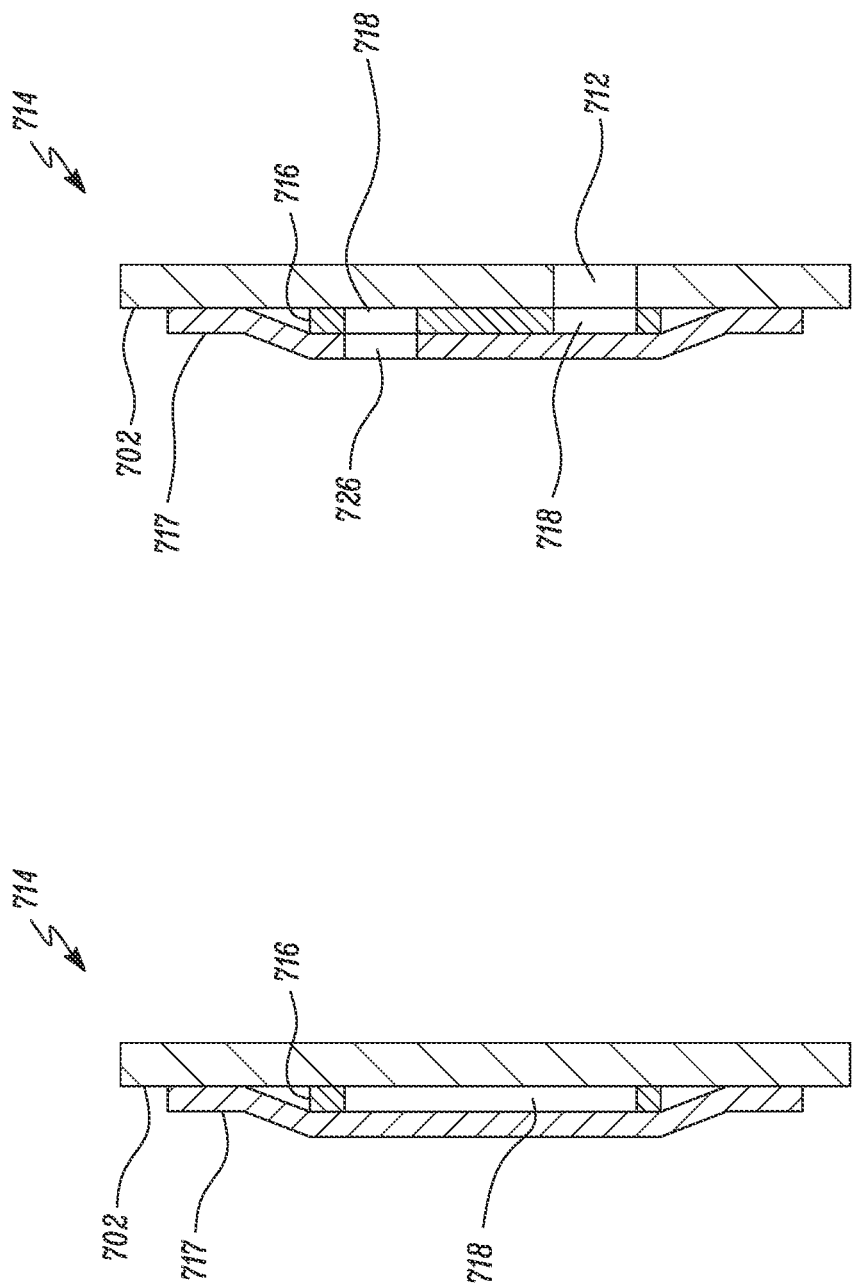
FIG. 8A is a cross sectional view of the patch of FIG. 7 along a section C-C', according to an aspect of the present disclosure.
FIG. 8B is a cross sectional view of the patch of FIG. 7 along a section D-D', according to an aspect of the present disclosure.

FIG. 7 shows a third sectional plane C-C' and a fourth sectional plane D-D'. Sectional view of a patch 714 through the plane C-C' is shown in FIG. 8A and sectional view of the patch 714 through plane D-D' is shown in FIG. 8B. With combined reference to FIGS. 7, 8A and 8B, the patch 714 includes a first plate 716 disposed on a tubular component 702. The patch 714 further includes a second plate 717. The second plate 717 at least partially encloses the first plate 716. The first plate 716 at least partially defines at least one flow channel 718 which receives exhaust gases from the at least one opening 712. The flow channel 718 imparts at least one directional change to the received exhaust gases. In the illustrated embodiment, the flow channel 718 is depicted as having a U-shape. The first plate 716 may further include an insert (not shown) disposed on the first plate 716 to define the flow channel 718. The flow channel 718 imparts two directional changes to the received exhaust gases. The flow channel 718 extends generally between a first end 728 of the first plate 716 and a second end 730 of the first plate 716.

The exhaust gases flow along a first arm 720 of the flow channel 718 in a first direction, then change flow direction to flow along a second arm 722. As the flow channel 718 is U-shaped, the first arm 720 is substantially orthogonal to the second arm 722. Further, the exhaust gases change flow direction once again to flow along a third arm 724. The third arm 724 is parallel to the first arm 720, and orthogonal to the second arm 722. The exhaust gases flow along the third arm 724, and then flow out of the tubular component 702 through an outlet opening 726. The outlet opening 726 is defined by the second plate 717 such that the outlet opening 726 receives exhaust gases from the flow channel 718.

Figure 9:
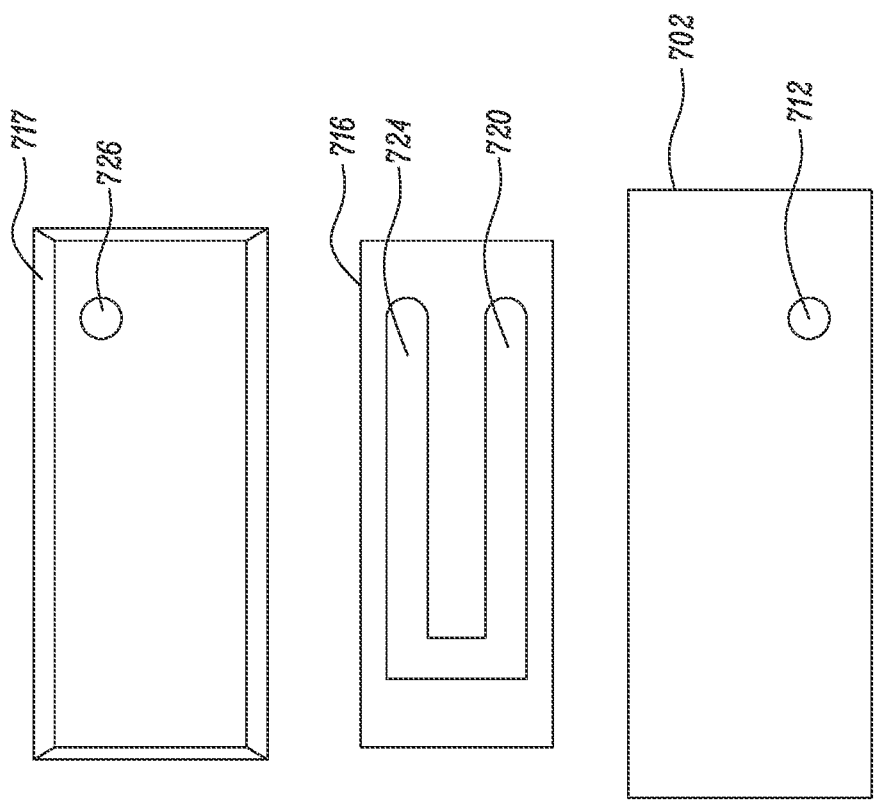
FIG. 9 is an exploded view of the patch of FIG. 7, according to another aspect of the present disclosure.

It should be contemplated that although the flow channel 718 is depicted as U-shaped, various other such shapes may also be envisioned. For example, the shape of the flow channel 718 may be selected from one or more of a U-shape, an L-shape, a Z-shape, or a V-shape. In an embodiment, the flow channel 718 may be helical in shape. All these shapes may impart one or more directional changes to the exhaust gases. Changes in flow direction allows release of sound energy, but further minimizes leakage of exhaust gases. Thus, a secondary exhaust gas flow path is defined through the at least one opening 712 in the tubular component 702, the flow channel 718 defined by the first plate 716, and the outlet opening 726 defined by the second plate 717. In an embodiment, the exhaust gases flow in an upstream direction due to the at least one directional change FIG. 9 shows the patch 714 in an exploded front view. The tubular component 702 includes the at least one opening 712 through which the exhaust gases enter the flow channel 718. The first plate 716 includes the flow channel 718 having the first arm 720 and the third arm 724. The second plate 717 includes the outlet opening 726. As the flow channel 718 is U-shaped, the at least one opening 712, and the outlet opening 726 are both disposed towards the first end 728 of the first plate 716. With change is shapes, there may be changes in relative position of the at least one opening 712, and the outlet opening 726.

Figure 10:
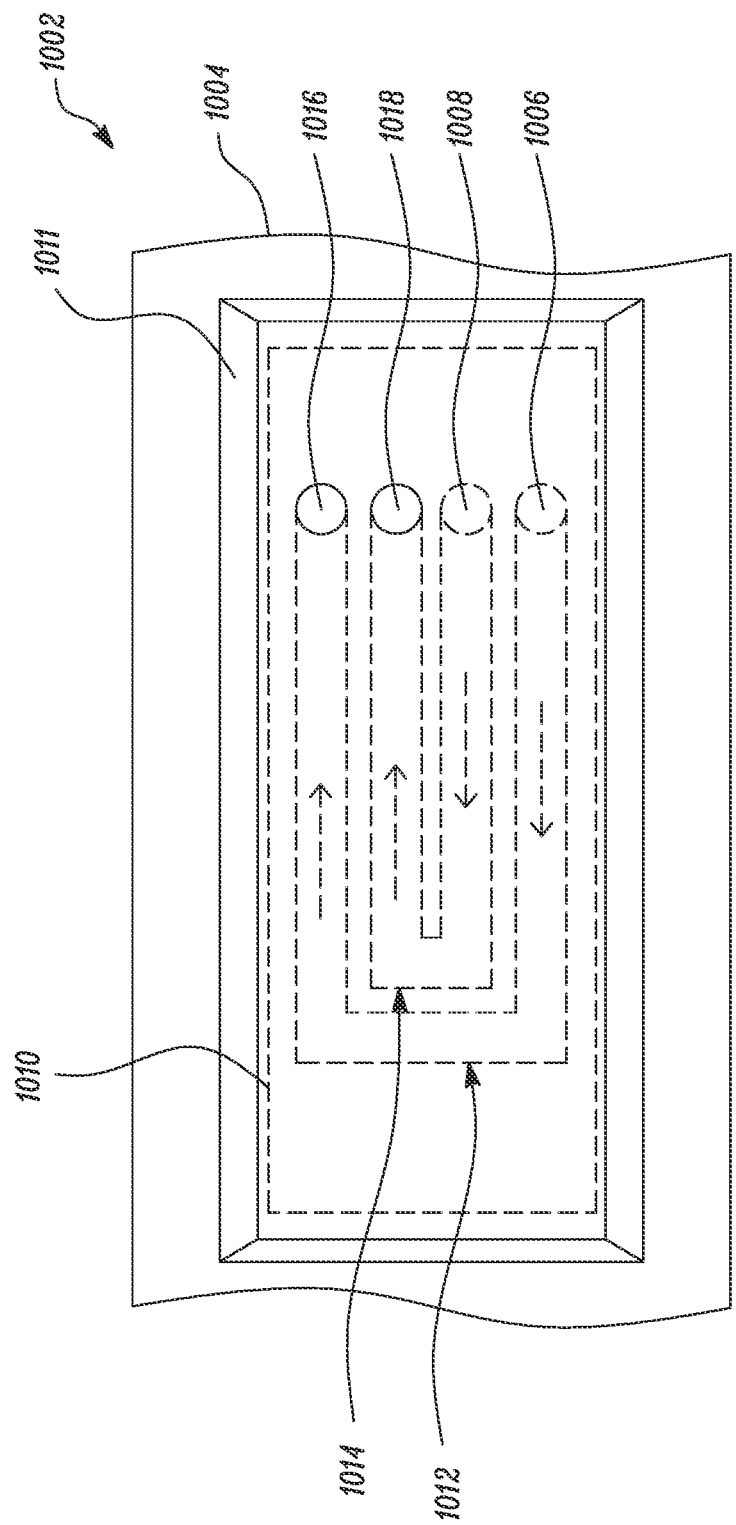
FIG. 10 is a front view of another patch for the tubular component of FIG. 2, according to another aspect of the present disclosure.

FIG. 10 shows another embodiment of the present disclosure. A front view of a patch 1002 is illustrated. In the illustrated embodiment, the patch 1002 has a substantially rectangular configuration. In other embodiments, the patch 1002 may have any other configuration. A tubular component 1004 defines at least one opening. The at least one opening includes a first opening 1006 and a second opening 1008.

The patch 1002 includes a first plate 1010 disposed on the tubular component 1004. The first plate 1010 defines at least one flow channel which receives exhaust gases from the at least one opening. In the illustrated embodiment, the at least one flow channel includes a first flow channel 1012 and a second flow channel 1014. The first flow channel 1012 is fluidly coupled with the first opening 1006 and the second flow channel 1014 is fluidly coupled with the second opening 1008. In the illustrated embodiment, the first and second flow channels 1012, 1014 are depicted as having a U-shape. The first plate 1010 may further include corresponding inserts (not shown) disposed on the first plate 1010 to define the first and second flow channels 1012, 1014. The first and second flow channels 1012, 1014 impart two directional changes to the received exhaust gases. The patch 1002 further includes a second plate 1011.

Figure 11:
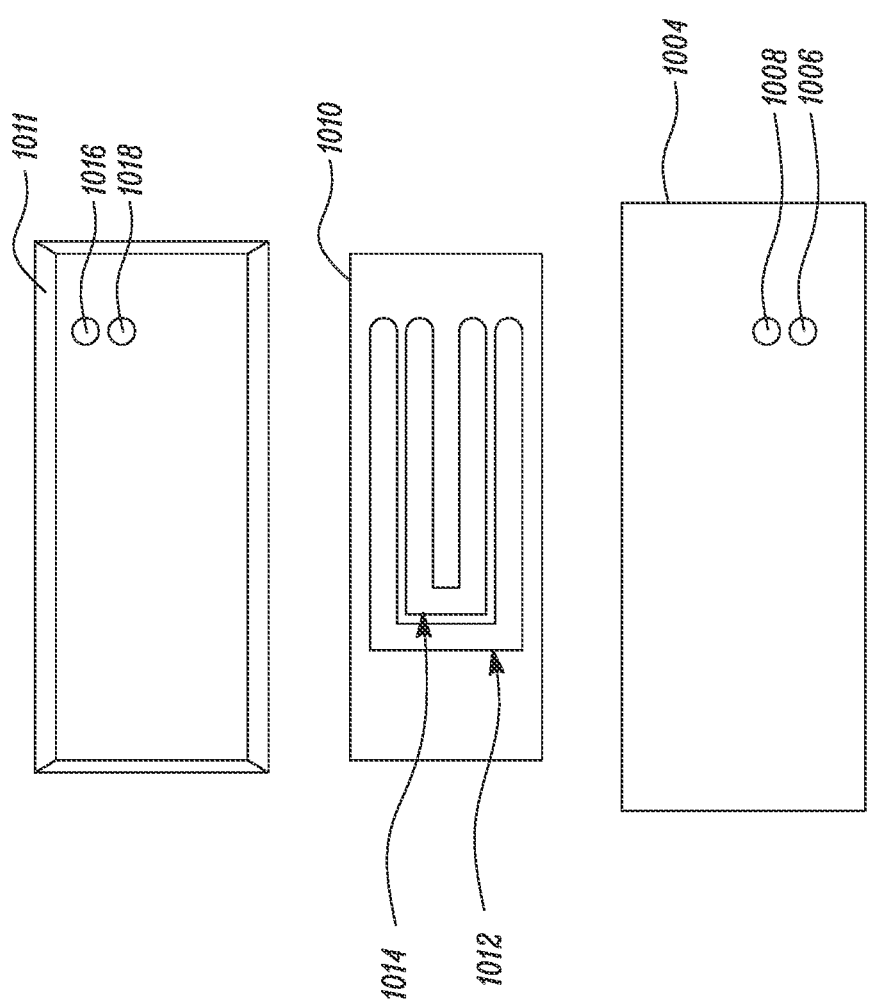
FIG. 11 is an exploded view of the patch of FIG. 10, according to another aspect of the present disclosure.

FIG. 11 depicts exploded front view of the patch 1002 of FIG. 10. With combined reference to FIGS. 10 and 11, the tubular component 1004 defines the first opening 1006 and the second opening 1008 which supply exhaust gases to the first flow channel 1012 and the second flow channel 1014 respectively. The second plate 1011 defines a first outlet opening 1016 and a second outlet opening 1018 such that the first outlet opening 1016 receives exhaust gases from the first flow channel 1012 and the second outlet opening 1018 receives exhaust gases from the second flow channel 1014. The exhaust gases flow from the first opening 1006, then flow through the first flow channel 1012 and exit through the first outlet opening 1016. Similarly, the exhaust gases flow from the second opening 1008, then flow through the second flow channel 1014 and exit through the second outlet opening 1018.

FIG. 12A shows another embodiment of the present disclosure. A tubular component 1202 for the system 100 is illustrated. In the illustrated embodiment, the tubular component 1202 is the muffler 108. In other embodiments, the tubular component 1202 may be any one or more of the exhaust components 104 and/or any portion of the system 100, such as the exhaust pipe, the tailpipe 106, and the like. The tubular component 1202 has a substantially hollow and cylindrical configuration defining a central axis Y-Y'. Accordingly, the tubular component 1202 includes an inner surface 1204 and an outer surface 1206. The tubular component 1202 also includes an inlet end 1208 and an outlet end 1210. The outlet end 1210 is disposed opposite and spaced apart with respect to the inlet end 1208 along the central axis Y-Y'. The tubular component 1202 defines a primary exhaust gas flow path along the inner surface 1204 between the inlet end 1208 and the outlet end 1210 along the central axis Y-Y'.

The tubular component 1202 defines at least one opening 1212. In the illustrated embodiment, the tubular component 1202 defines a single opening 1212. However, the at least one opening 1212 may include any number of openings 1212 as per application requirements, and the present disclosure is not limited by the number of openings 1212 in any manner.

At least one tab portion 1214 is coupled to the opening 1212. In an embodiment, the at least one tab portion 1214 is an integral part of the tubular component 1202. In the illustrated embodiment, the at least one tab portion 1214 includes a single tab portion 1214. However, the at least one tab portion 1214 may include multiple tab portions 1214 as per application requirements. The tab portion 1214 is coupled to the tubular component 1202 at an angular orientation with the central axis Y-Y'. The tab portion 1214 has a first end 1216 and a second end 1218. The tab portion 1214 is coupled to the tubular component 1202 at the first end 1216. The second end 1218 of the tab portion 1214 angularly extends outwards from the tubular component 1202. In an embodiment, the tab portion 1214 extends in an upstream direction. In an embodiment, the at least one tab portion 1214 imparts a directional change to the exhaust gases such that the exhaust gases flow in an upstream direction due to the at least one directional change. The system further includes a patch 1220 which covers the opening 1212. The patch 1220 includes a plate 1222 disposed on the tubular component 1202. The plate 1222 has a first end 1224 and a second end 1226. The first end 1224 of the plate 1222 is disposed towards the opening 1212. The plate 1222 defines at least one outlet opening 1228 towards the second end 1226. In the illustrated embodiment, the plate 1222 defines a single outlet opening 1228.

FIG. 12B shows a top view of the tubular component 1202 without the plate 1222. It should be understood that the plate 1222 is not shown for clarity purposes, and the plate 1222 is an integral part of the design of the patch 1220. The tab portion 1214 defines at least one cut-out portion 1230 at the second end 1218 of the tab portion 1214. In the illustrated embodiment, the tab portion 1214 includes multiple cut-out portions 1230 such that the cut-out portions 1230 provide a restriction to flow of exhaust gases. A secondary exhaust gas flow path is defined through the opening 1212 in the tubular component 1202, the cut-out portions 1230 in the tab portion 1214, and the outlet opening 1228 in the plate 1222. The exhaust gases flow from the tubular component 1202 through opening 1212 along the tab portion 1214. The exhaust gases then flow across the multiple cut-out portions 1230 and flow through the outlet opening 1228.

Figure 13:
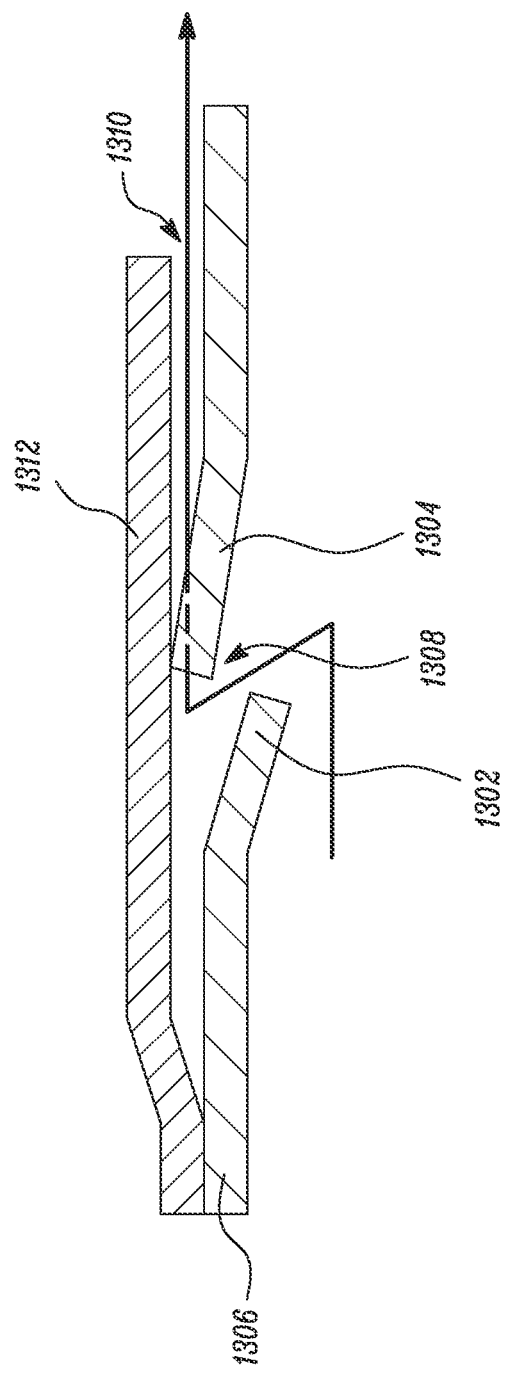
FIG. 13 is a schematic sectional side view of another vehicle exhaust system, in accordance with the present invention.

FIG. 13 illustrates another embodiment of the present disclosure. At least one tab portion includes a first tab portion 1302 and a second tab portion 1304. The first tab portion 1302 and the second tab portion 1304 are angularly oriented to a tubular component 1306. In the illustrated embodiment, the first tab portion 1302 and the second tab portion 1304 are disposed in parallel to each other. In an embodiment, the first tab portion 1302 and the second tab portion 1304 are disposed diametrically opposite to each other relative to an opening 1308 defined by the tubular component 1306. Each of the first tab portion 1302 and the second tab portion 1304 define cut-out portions at respective ends to cause flow restrictions to exhaust gases. The exhaust gases flow through the opening 1308 between the first tab portion 1302 and the second tab portion 1304. At first, the cut-out portions defined at end of first tab portion 1302 cause flow restrictions to the exhaust gases. Then, the exhaust gases flow through the opening 1308 between the first tab portion 1302 and the second tab portion 1304. The cut-out portions defined at ends of second tab portion 1304 cause flow restrictions to the exhaust gases. Afterwards, the exhaust gases exit the tubular component 1306 through an outlet opening 1310 defined by a plate 1312.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A vehicle exhaust system comprising:
    a tubular component having an inner surface and an outer surface and extending along a central axis from an inlet end to an outlet end and defining a primary exhaust gas flow path for exhaust gases in a first direction from the inlet end toward the outlet end; the outlet end defining a primary outlet for the exhaust gases from the tubular component to atmosphere;
    at least one opening defined by the tubular component, wherein the at least one opening extends through the inner surface and the outer surface; and
    a first plate disposed on the outer surface of the tubular component and covering the at least one opening;
    a second plate defining—an elongated flow—channel extending away from the at least one opening and adapted to receive exhaust gases from the at least one opening, the first plate at least partially defining an outlet opening adapted to receive exhaust gases from the flow channel;
    wherein a secondary exhaust gas flow path is defined by the at least one opening in the tubular component, through the —elongated flow channel, and through the outlet opening at least partially defined by the first plate;
    wherein exhaust gases flowing through the secondary exhaust gas flow path are exhausted to atmosphere in a different location than the primary outlet.

2. The vehicle exhaust system of claim 1, wherein the exhaust gases entering the elongated flow channel is remotely located from the exhaust gases exiting the elongated flow channel.

3. The vehicle exhaust system of claim 1, wherein the flow channel comprises a plurality of parallel flow paths within the channel.

4. The vehicle exhaust system of claim 1, wherein the secondary exhaust gas flow path through the elongated flow channel comprises exhaust gas flowing out of the tubular component through the at least one opening and into the elongated flow channel in a first direction and flowing in a second direction, opposite the first direction, and flowing through the outlet opening defined by the plate.

5. The vehicle exhaust system of claim 1, wherein the first plate at least partially covers the second plate.

6. The vehicle exhaust system of claim 1, wherein the outlet opening is positioned upstream of the at least one opening in the tubular component.

7. The vehicle exhaust system of claim 1, wherein the elongated flow channel imparts at least one directional change to the exhaust gases.

8. The vehicle exhaust system of claim 7, wherein the elongated flow channel imparts at least two directional changes to the exhaust gases.

9. The vehicle exhaust system of claim 1, wherein the elongated flow channel is defined by a slot in the second plate.

10. A vehicle exhaust system comprising:
    a tubular component having an inner surface and an outer surface and extending along a central axis from an inlet end to an outlet end and defining a primary exhaust gas flow path for exhaust gases in a first direction from the inlet end toward the outlet end; the outlet end defining a primary outlet for the exhaust gases from the tubular component to atmosphere;
    at least one opening defined by the tubular component, wherein the at least one opening extends through the inner surface and the outer surface;
    a first plate disposed on the tubular component, the first plate comprising an elongated flow channel defined by a slot in the first plate and adapted to receive exhaust gases from the at least one opening;
    a second plate separate from the first plate and covering the elongated flow channel and comprising at least one outlet opening positioned remote from the at least one opening in the tubular component and adapted to receive exhaust gases from the elongated flow channel; and
    wherein a secondary exhaust gas flow path is defined by the at least one opening in the tubular component, through the flow channel, and through the outlet opening defined by the second plate;
    wherein exhaust gases flowing through the secondary exhaust gas flow path are exhausted to atmosphere in a different location than the primary outlet.

11. The vehicle exhaust system of claim 10, wherein the exhaust gases entering the flow channel are remotely located from the exhaust gases exiting the flow channel.

12. The vehicle exhaust system of claim 10, wherein the flow channel comprises a plurality of parallel flow paths.

13. The vehicle exhaust system of claim 10, wherein the secondary exhaust gas flow path through the flow channel comprises exhaust gas flowing out of the tubular component through the at least one opening and into the flow channel in a first direction and flowing in a second direction, opposite the first direction, and flowing through the outlet opening defined by the second plate.

14. The vehicle exhaust system of claim 10, wherein the flow channel imparts at least one directional change to the exhaust gases.

15. The vehicle exhaust system of claim 14, wherein the flow channel imparts at least two directional changes to the exhaust gases.

16. The vehicle exhaust system of claim 15, wherein the exhaust gases are exhausted to atmosphere in a different location than the primary exhaust gases.

17. A vehicle exhaust system comprising:
    a tubular component having an inner surface and an outer surface and extending along a central axis from an inlet end to an outlet end and defining a primary exhaust gas flow path for exhaust gases in a first direction from the inlet end toward the outlet end; the outlet end defining a primary outlet for the exhaust gases from the tubular component to atmosphere;
    at least one opening defined by the tubular component, wherein the at least one opening extends through the inner surface and the outer surface; and
    a first plate disposed on the outer surface of the tubular component and covering the at least one opening;
    a second plate defining an elongated flow channel defined by a slot in the second plate and extending away from the at least one opening, the first plate adapted to receive exhaust gases from the at least one opening and at least partially defining an outlet opening adapted to receive exhaust gases from the flow channel;
    wherein a secondary exhaust gas flow path is defined by the at least one opening in the tubular component, through the elongated flow channel, and through the outlet opening at least partially defined by the first plate;
    wherein exhaust gases flowing through the secondary exhaust gas flow path are exhausted to atmosphere in a different location than the primary outlet.

18. The vehicle exhaust system of claim 17, wherein the exhaust gases entering the elongated flow channel is remotely located from the exhaust gases exiting the elongated flow channel.

19. The vehicle exhaust system of claim 17, wherein the flow channel comprises a plurality of parallel flow paths within the channel.

20. The vehicle exhaust system of claim 17, wherein the secondary exhaust gas flow path through the elongated flow channel comprises exhaust gas flowing out of the tubular component through the at least one opening and into the elongated flow channel in a first direction and flowing in a second direction, opposite the first direction, and flowing through the outlet opening defined by the plate.

21. The vehicle exhaust system of claim 17, wherein the first plate at least partially covers the second plate.

22. The vehicle exhaust system of claim 17, wherein the outlet opening is positioned upstream of the at least one opening in the tubular component.

23. The vehicle exhaust system of claim 17, wherein the elongated flow channel imparts at least one directional change to the exhaust gases.

24. The vehicle exhaust system of claim 23, wherein the elongated flow channel imparts at least two directional changes to the exhaust gases.

* * * * *